United States Patent
Silnutzer et al.

(10) Patent No.: US 8,334,614 B1
(45) Date of Patent: Dec. 18, 2012

(54) VESSEL OF INTEREST COMMUNICATIONS SYSTEM

(75) Inventors: David Silnutzer, Panama City, FL (US); Steve Thorsted, Panama City, FL (US); Jesse Miles, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 515 days.

(21) Appl. No.: 12/658,742

(22) Filed: Feb. 1, 2010

(51) Int. Cl.
*H02J 1/00* (2006.01)

(52) U.S. Cl. .......................... 307/1; 307/DIG. 1; 307/9.1

(58) Field of Classification Search .................. 307/9.1, 307/1, DIG. 1; 114/328; 340/850
See application file for complete search history.

(56) References Cited

U.S. PATENT DOCUMENTS

| | | | | |
|---|---|---|---|---|
| 8,104,420 | B2 * | 1/2012 | Wiggins et al. | 114/253 |
| 2011/0075646 | A1 * | 3/2011 | Smith | 370/338 |
| 2011/0162573 | A1 * | 7/2011 | Race et al. | 114/328 |

* cited by examiner

*Primary Examiner* — Daniel Cavallari
(74) *Attorney, Agent, or Firm* — James T. Shepherd

(57) ABSTRACT

A communication system electromagnetically communicates beyond the electromagnetic barrier created by a physical barrier. First pre-existing electrical AC power distributing infrastructure extends on one side of the physical barrier and has electrical conductors and AC outlets. At least one first communication subsystem is located at the one side of the physical barrier and is connected to the electrical conductors. At least one second communication subsystem is located at an opposite side from the first side of the physical barrier. The first and second communication subsystems each have a first handheld transceiver radio, a second transceiver radio, a radio-to-local-area-network converter, and a power line Ethernet adapter. At least one electrical conductor extends the electrical power distributing infrastructure on the one side to the power line Ethernet adapter of the second communication subsystem on the opposite side of the physical barrier. The cost-effective system is made of commercial and government off-the-shelf components.

19 Claims, 2 Drawing Sheets

VESSEL OF INTEREST COMMUNICATIONS SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a reliable, specialized communication system. More particularly, this invention is for a communication system utilizing pre-existing, in situ electrical power lines for communicating beyond a physical barrier (ship hull, concrete wall, underground facility, etc.) that would normally "cut off" communications between radio users.

Currently, when vessel boarding teams, emergency responders, and other disaster relief groups try to effectively take appropriate action to situations on the other side of physical boundaries or barriers, their efforts can be frustrated by lack of communications. By way of a more specific example, when individuals traverse from the exterior to the interior of the metal structure of an ocean going vessel, radio contact between the interior and exterior is prevented due to the properties of the ship's hull (metal) and its attenuation and reflection of radio frequency waves. Consequently, the best solutions or effective responses to a wide variety of emergencies may not happen when they are needed. This problem is well known and efforts are still ongoing to find a solution.

Thus, in accordance with this inventive concept, a need has been recognized in the state of the art for a communication system including backpack portable suites of equipment that enable handheld radio communications between at least two users using a pre-existing power distribution installation in an area that would normally be "cut off" from other radio users due to the physical barrier created by a ship's hull, concrete wall, or underground facility, etc.

SUMMARY OF THE INVENTION

The present invention provides a system for communicating beyond an electromagnetic barrier created by a physical barrier. A pre-existing first electrical power distributing infrastructure is disposed on one side of the physical boundary or barrier and has electrical conductors and AC outlets. At least one first communication subsystem also is disposed at the one side of the physical boundary and is connected to the electrical conductors of the first electrical power distributing infrastructure. The first communication subsystem has a first handheld transceiver radio, a second transceiver radio, a radio-to-local-area-network converter, and a power line Ethernet adapter. At least one second communication subsystem is disposed at an opposite side from the first side of the physical boundary and has a first handheld transceiver radio, a second transceiver radio, a radio-to-local-area-network converter, and a power line Ethernet adapter. At least one electrical conductor extends from the electrical power distributing infrastructure on the one side to the power line Ethernet adapter of the second communication subsystem on the opposite side of the physical boundary. The first communication subsystem at the one side of the physical boundary is connected to one of the AC outlets and to the electrical conductors of the electrical power distributing infrastructure, and the second communication subsystem is connected to at least one electrical conductor by another of the AC outlets. The radio-to-local-area-network converters of the subsystems convert output audio signals from each interconnected second transceiver radio into data packets for transmission via Ethernet, and vise versa for incoming audio signals, and each power-line Ethernet adapter is capable of adapting data packets for Ethernet communications to provide additional Ethernet interfaces without the need for additional Ethernet cable installations.

An object of the invention is to provide a system for communicating using pre-existing power distributing infrastructure in a vessel of interest or other structure to allow communications previously blocked by a physical boundary such as a ship's hull, concrete wall, large enclosure or underground facility, for examples.

Another object of the invention is to provide a cost effective system for communicating across an electromagnetic barrier made from components of commercial off-the-shelf (COTS) or government off-the-shelf (GOTS) technologies.

Another object of the invention is to provide backpack portable suites of COTS or GOTS equipment allowing communications man-to-man and ship-to-ship across physical boundaries and/or a electromagnetic barriers.

Another object of the invention is to provide a system enabling voice communications among members of a VBSS (vessel boarding search and seizure) team throughout a vessel of interest.

These and other objects of the invention will become more readily apparent from the ensuing specification when taken in conjunction with the appended claims.

DESCRIPTION OF THE PREFERRED EMBODIMENT

Figure 1:
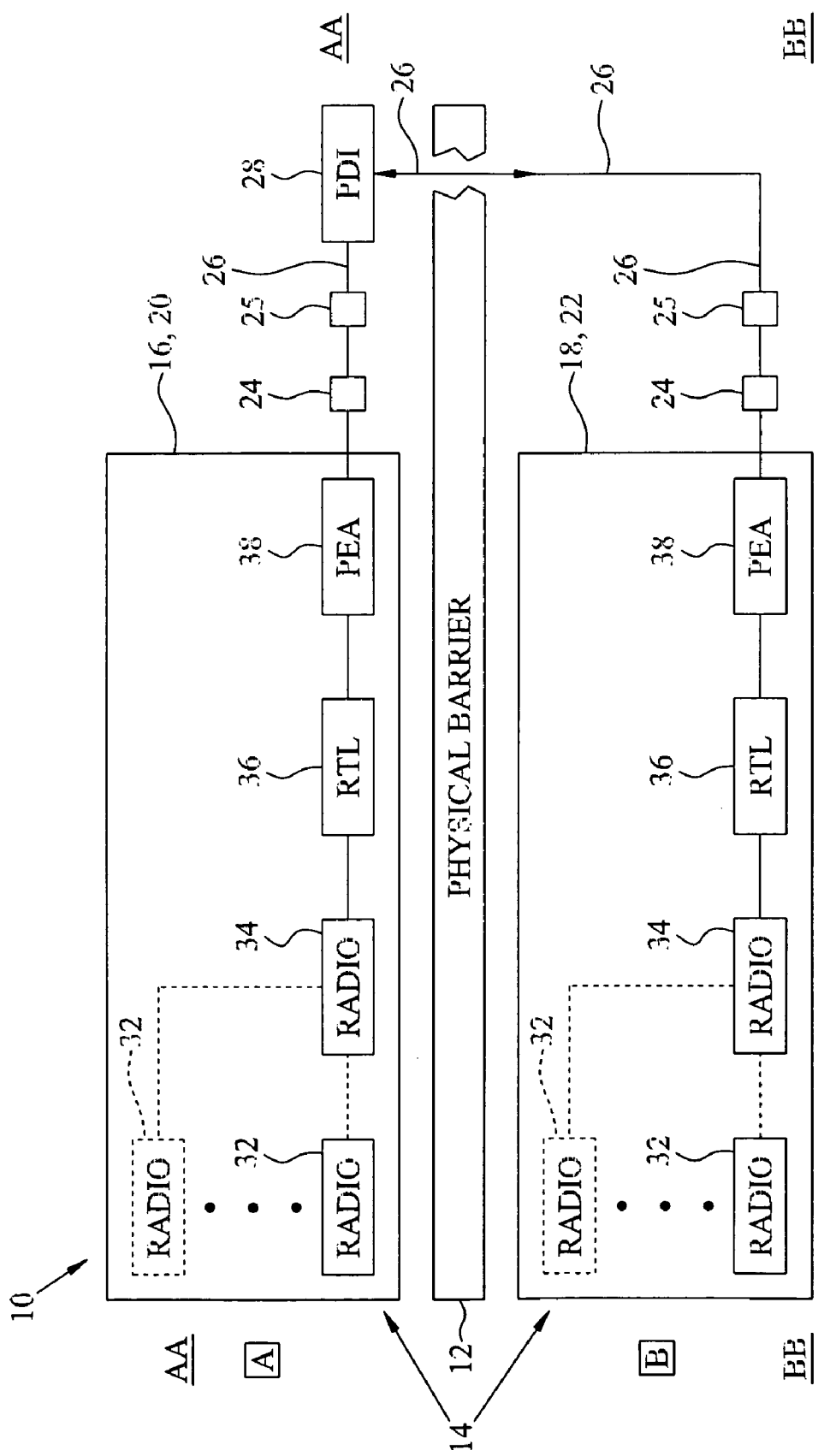
FIG. 1 shows a schematic block diagram of the system of the invention allowing communications across a physical boundary such a ship's hull.
Figure 2:
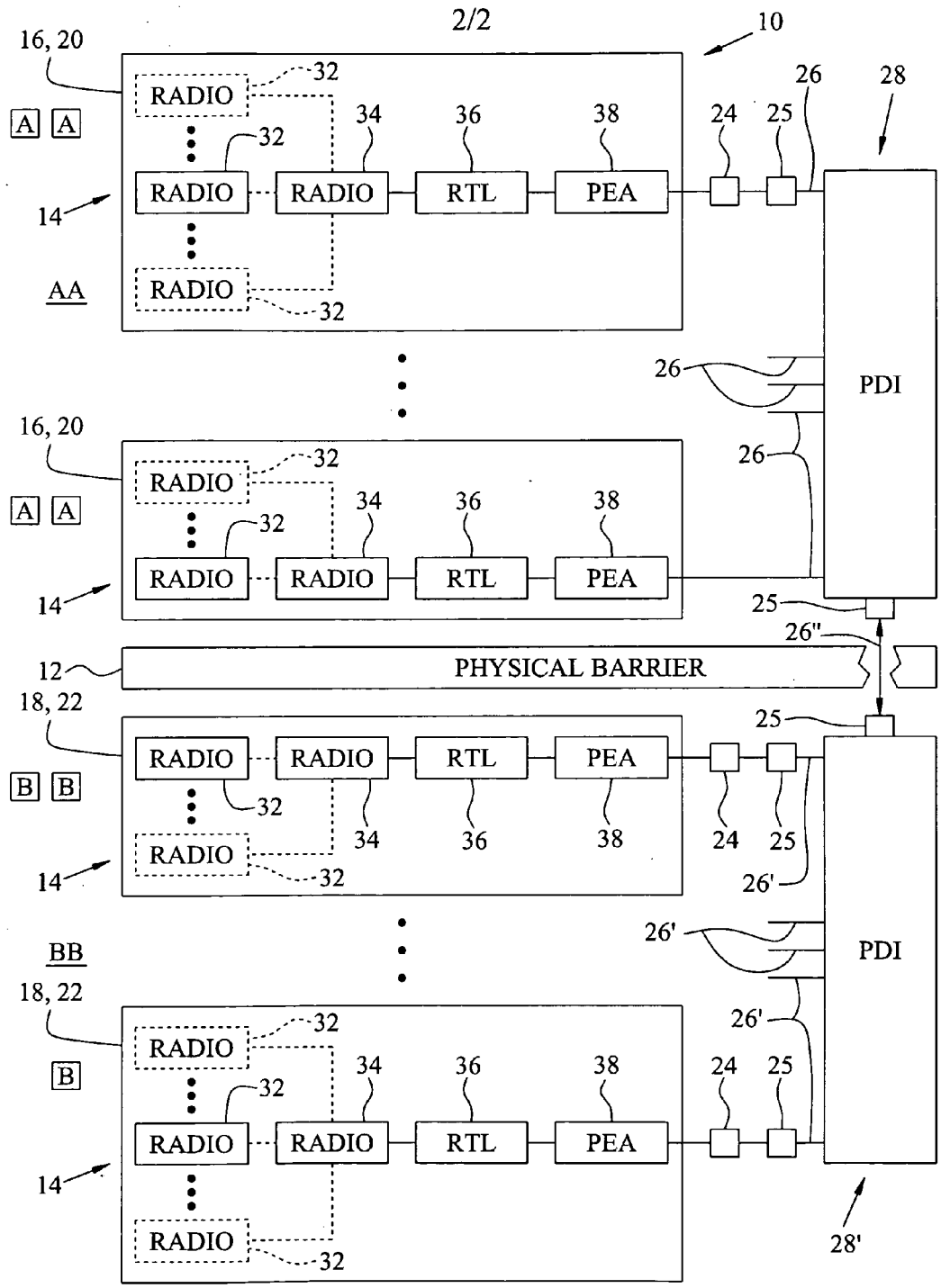
FIG. 2 shows another embodiment of the system of the invention allowing communications across a physical barrier such a ship's hull among several members of aVBSS, for example.

Referring to FIGS. 1 and 2, the vessel of interest communication system 10 of the invention is schematically depicted for providing selective bi-directional electromagnetic communications among members of a VBSS team across a physical boundary or barrier 12, such as a ship's metal or non-metal hull, concrete wall, underground facility, etc. Irrespective of its physical thickness or shape, physical barrier 12 has the properties to block, attenuate, or reflect transmission of electromagnetic radiation, such as radio waves and shield or distort the usefulness of radio transmissions across it.

Communication system 10 has at least one communication subsystem 14 that can be sized to be backpack portable by each member of the VBSS team. This compact size allows each mobile team member to carry a separate communication subsystem 14 among different interior or exterior compartments 16 or 18 on either side of physical barrier 12 during boarding or inspection procedures. Walls 20 and 22 of interior and exterior compartments 16 and 18 also may have properties that create additional physical/shielding barriers or boundaries for electromagnetic transmissions and may augment the attenuation provided by physical barrier 12. However, communication system 10 overcomes these obstacles too.

Each communication subsystem 14 has a conventional electrical connector plug 24 for mating with AC power outlets 25 that may be on the electrical conductors 26 of an existing wiring system or pre-existing AC power distributing infrastructure PDI 28 in the ship or facility. Typically, at least one of electrical conductors 26 extends from PDI 28 to pass through physical barrier 12. A team member may also carry an additional length of electrical conductor to function as an electrically integral extension of one of electrical conductors 26 and add or plug-in this length of electrical conductor to one of electrical conductors 26 of PDI 28 to pass through barrier 12. This integral extension of one of the electrical conductors 26 will assure bridging of barrier 12 and allow a positive linking of components for communications as will be described. This power distributing infrastructure (PDI) 28 may also have additional AC power outlets 25 on one or more of its electrical conductors 26 that may be used to link up with an external AC power source (not shown) to feed electrical power over the electrical conductors 26 of power distributing infrastructure 28 and/or also feed such AC power to structure outside of infrastructure 28.

Referring to FIG. 1, each communication subsystem 14 allows voice and/or data communications for each member of a team and is made from COTS/GOTS equipment of proven technology. All subsystems 14 utilize the existing power distributing infrastructure 28 of a ship or facility as a conduit for these communications. Optionally, each communication subsystem 14 has a first handheld transceiver radio 32 carried by each team member, and a second radio transceiver radio 34 that is tuned to be compatible to transmit and receive information to and from first handheld radio 32. Optionally, some or all of subsystems 14 can have several first handheld transceiver radios 32 in electromagnetic communication with radios 34 to allow more communications by more team members on either sides of barrier 12. Each sub-system 14 also has a separate radio-to-local-area-network (RTLAN) converter (RTL) 36 coupled to second radio 34, and a power-line-Ethernet-adapter (PEA) 38 is coupled between RTL 36 and electrical connector plug 24.

First handheld radio 32 and second radio 34 are in common use today by military, law enforcement, and emergency response personnel. Typically, many professional and tactical radios include an audio interface to which an external device can be connected, such as an auxiliary microphone/speaker or intercom box and both of these radios can be so equipped if desired.

First handheld radio 32 is not physically connected to second radio 34 but is electromagnetically coupled via radio links provided by bidirectional transmissions between these two radios. This capability allows a team member to carry first radio 32 to different parts in an interior or exterior compartment 16 or 18 depending on which side of physical barrier 12 the team member is located. Each team member can communicate with other team members each carrying first radios 32 through power distribution infrastructure 28 via second radios 34 in each communication subsystem 14 that is interconnected to electrical conductors 26 of infrastructure 28.

The bidirectional transmissions between members are enabled by RTL converter 36 to transmit voice and data radio communications via Ethernet. RTL converter 36 is connected to both the audio input/output interfaces on a typical handheld radio used as second radio 34, and to PEA 38 via an Ethernet or serial port on a hub, switch or router that is part of a local area network. RTL converter 36 converts the output audio signal from each radio 34 into data packets for transmission via Ethernet, and vise versa for incoming audio signals. A typical commercially available unit for RTL converter 36 is marketed as the AudioMate 360r by VoiceInterop, 8000 N. Federal Highway, Suite 100, Boca Raton, Fla. 33487 USA, although other units capable of translating audio signals to data packets could be selected.

Power line adapter PEA 38 utilizes electrical conductors 26 of existing power distribution infrastructure 28 in a ship, building, or underground facility as a conduit through which to pass the data of the data packets. PEA 38 is connected to electrical connector plug 24 that plugs directly into a standard AC outlet 25 of power distributing infrastructure 28, and transmits/receives data over its electrical conductors 26 (facility AC power lines) to and from another interconnected power-line Ethernet adapter PEA 38 in another communication sub-system 14 within or outside of the ship or facility. A typical commercially available unit for PEA adapter 38 is marketed as the CORINEX HOMENET POWER-CXP-HD200-W2HNA by Corinex Communications Corp., 601-905 West Pender Street, Vancouver, BC, BC V6C IL6 Canada, although other units capable of adapting data packets for Ethernet communications could be used. This utilization of PEA adapter 38 gives a user additional Ethernet interfaces without the need for additional Ethernet cable installations.

Together, first handheld radio 32, second radio 34, RTL converter 36, and the power-line Ethernet adapter of PEA 38 of each communication subsystem 14 enable the utilization of power lines 26 of a facility's power distribution infrastructure 28 for a communications channel to be established among a number of users, or team members across an electro-magnetic barrier 12. The presence of actual AC power on conductors 26 of infrastructure 28 is not necessary for this technology to work correctly since battery power can be designed into communication system 10 if needed.

Referring again to the embodiment of communication system 10 shown in FIG. 1, typical operation can be established quickly between two operators each equipped with a backpack portable communication subsystem 14. These operators could be, for example, an interior operator A, a member of a boarding team in the interior AA of a ship's hull and on one side of physical barrier 12 created by the ship's steel hull or superstructure, and an exterior operator B, another member of the boarding team, at the exterior BB of the ship on the other side of physical barrier 12. Exterior operator B locates an AC power outlet 25 connected to at least one of electrical conductors 26 of power distribution infrastructure 28 and plugs electrical conductor plug 24 of the backpack portable communication subsystem 14 of exterior operator B into this AC outlet 25. Exterior operator B automatically sequences through a power-up phase of electrically interconnected radios 32 and 34, RTL converter 36 and PEA adapter 38 and is ready to be connected to interior communications subsystem 14 of interior operator A. Exterior operator B may then remain in position on the outside of the ship. Interior operator A enters the vessel and locates an AC power outlet 25 connected to at least one of electrical conductors 26 of infrastructure 28. Interior operator A then inserts plug 24 of the interior communication subsystem 14 into the AC outlet 25 and automatically sequences through a power-up phase of electrically interconnected radios 32 and 34, RTL converter 36 and PEA adapter 38 of the backpack portable interior communications sub-system 14 and is connected to communicate with exterior communications sub-system 14 of exterior operator B. Interior operator A may remain in position or move about interior compartment 16 and transmit/receive information via first handheld radio 32. As the boarding procedure progresses, interior operator A may pull out the previously plugged-in connector plug 24 of interior sub-system 14, then proceed onward with others of the boarding team and re-insert plug 24 in another AC power outlet 25 in a different interior compartment for communications from there. In addition, at least some of communication subsystems 14 may have a plurality of first handheld transceiver radios 32 in electromagnetic communication with radios 34 to accommodate more members of a team on either side of barrier 12. Thus, once both interior and exterior operators A and B power-up their subsystems 14 to link them together, communications and more responsible co-action among interior and exterior personnel is assured.

The embodiment of communication system 10 of FIG. 2 shows a plurality of communication subsystems 14 that may each be used by one or more interior operators A, members of the boarding team, that each carries a separate first handheld radio 32 as they move about within their respective interior compartments 16. Communication subsystems 14 can be made to be compatible for communications with first handheld radios 32 of one or more or all the interior subsystems 14 in accordance with known Ethernet protocol to accommodate communications as boarding members move about in interior AA of the ship or facility being investigated. More than one exterior operator B on the exterior BB, other side of physical barrier 12, also can have this increased communications capability among exterior operators B as well as interior operators A in accordance with established Ethernet practices. Exterior operators B may plug into a second power line infrastructure 28' on the opposite side of physical barrier 12. This is no problem so long as at least one linking electrical conductor 26' is connected to AC outlets in both infrastructures 28 and 28' to assure communications between them.

Second infrastructure 28' also has electrical conductors 26' and AC outlets 25 for coupling and interconnecting subsystems 14. An electrical conductor link 26" can extend from either of infrastructures 28 and 28' and be connected to AC outlets 25 in both of them to assure successful communications.

Utilization of other infrastructure other than the electrical conductors 26 of AC power distribution infrastructure, 28, such as metal piping or air ducting has been considered as a potential conductor but has been found to be wanting for data transmissions. The piping and ducting were not considered adequate for reliable communications due to the need for two separate conductors, and both the air ducting and piping are tied to the facility "ground" circuit. Typically, the utilization of acceptable communications over an electrical conductor requires a ground reference to which a voltage signal can differ. Without two conductors, a difference can not exist and hence the piping and ducting approaches were marginal at best.

All components of the man-portable communications system 10 of the invention are made and packaged to survive in harsh environments where communications subsystems 14 are used. Modifications and alternate embodiments of communications system 10 of the invention can be adapted from other low cost commercial-off-the-shelf and government-off-the-shelf inventories for other applications. In addition to the adaptive and highly functional communications system described, communication system 10 of the invention could have different electronics packages to create other reliable cost-effective systems.

The disclosed components and their arrangements as disclosed herein, all contribute to the novel features of this invention. Communications system 10 of the invention gives boarding team members a real time communication capability to successfully complete a mission and reduce the hazards usually attendant such operations. Therefore, system 10 of the invention, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A system for electromagnetically communicating beyond a physical barrier comprising:
    a first electrical AC power distributing infrastructure on one side of the physical barrier, said infrastructure having electrical conductors and AC outlets;
    a first communication subsystem at the one side of the physical barrier and being connected to said electrical conductors of said first electrical power distributing infrastructure, said first communication subsystem having a first handheld transceiver radio, a second transceiver radio, a radio-to-local-area-network converter, and a power line Ethernet adapter;
    a second communication subsystem at an opposite side from the first side of the physical barrier, said second communication subsystem having a first handheld transceiver radio, a second transceiver radio, a radio-to-local-area-network converter, and a power line Ethernet adapter; and
    at least one electrical conductor extending from said electrical power distributing infrastructure to said power line Ethernet adapter of said second communication subsystem.

2. The system of claim 1 wherein said first communication subsystem is connected to one of said AC outlets to said electrical conductors of said electrical power distributing infrastructure, and said second communication subsystem is connected to said at least one electrical conductor by another of said AC outlets.

3. The system of claim 2 wherein each radio-to-local-area-network converter converts output audio signals from each interconnected second transceiver radio into data packets for transmission via Ethernet, and vise versa for incoming audio signals, and each power line Ethernet adapter is capable of adapting data packets for Ethernet communications to provide additional Ethernet interfaces without the need for additional Ethernet cable installations.

4. The system of claim 3 wherein at least one of said second handheld transceiver radios of said first and second communication subsystems have a plurality of first handheld transceiver radios in electromagnetic communication therewith.

5. A system for electromagnetically communicating across a physical barrier having one side and an opposite side comprising:
    an electrical AC power distributing infrastructure on the one side of the physical barrier, said infrastructure having electrical conductors and AC outlets;
    a plurality of first communication subsystems at the one side of the physical barrier and being connected to said electrical conductors of said first electrical power distributing infrastructure, said plurality of first communication subsystems each having a first handheld transceiver radio, a second transceiver radio, a radio-to-local-area-network converter, and a power line Ethernet adapter;
    at least one second communication subsystem at the opposite side of the physical barrier, said second communication subsystem having a first handheld transceiver radio, a second transceiver radio, a radio-to-local-area-network converter, and a power line Ethernet adapter; and at least one electrical conductor extending from said power line Ethernet adapter of said second communication subsystem to said power distributing infrastructure.

6. The system of claim 5 further comprising:

a plurality of second communication subsystems at the opposite side of the physical barrier, said plurality of second communication subsystems each having a first handheld transceiver radio, a second transceiver radio, a radio-to-local-area-network converter, and a power line Ethernet adapter.

7. The system of claim 6 further comprising:

a second electrical AC power distributing infrastructure on the opposite side of the physical barrier, said second infrastructure having electrical conductors and AC outlets for coupling to said plurality of second communication subsystems.

8. The system of claim 7 further comprising:

at least one linking electrical conductor extending between said first electrical power distributing infrastructure and said second electrical power distributing infrastructure.

9. The system of claim 8 wherein at least one of said second handheld transceiver radios of said first and second communication subsystems have a plurality of first handheld transceiver radios in electromagnetic communication therewith.

10. A method of electromagnetically communicating beyond a physical barrier comprising the steps of:

connecting a first communication subsystem to at least one electrical conductor of an electrical AC power distributing infrastructure at one side of the physical barrier;

interconnecting a first handheld transceiver radio, a second transceiver radio, a radio-to-local-area-network converter, and a power line Ethernet adapter in said first communication subsystem;

providing a second communication subsystem at a side opposite the first side of the physical barrier;

interconnecting a first handheld transceiver radio, a second transceiver radio, a radio-to-local-area-network converter, and a power line Ethernet adapter in said second communication subsystem; and extending at least one electrical conductor from said electrical AC power distributing infrastructure on the one side to said power line Ethernet adapter of said second communication subsystem on the opposite side of the physical barrier.

11. The method of claim 10 further including the step of:

connecting said first communication subsystem at the one side of the physical barrier to one of said AC outlets to said electrical conductors of said electrical power distributing infrastructure, and connecting said second communication subsystem to said at least one electrical conductor by another of said AC outlets.

12. The method of claim 11 further comprising the steps of:

converting output audio signals from each interconnected second transceiver radio into data packets by each radio-to-local-area-network converter for transmission via Ethernet, and vise versa for incoming audio signals, and adapting data packets for Ethernet communications by each power line Ethernet adapter to provide additional Ethernet interfaces without the need for additional Ethernet cable installations.

13. A method of electromagnetically communicating across a physical barrier having one side and an opposite side for electromagnetic energy comprising the steps of:

connecting a plurality of first communication subsystems to at least one electrical conductor of a first electrical AC power distributing infrastructure at one side of the physical barrier;

interconnecting a first handheld transceiver radio, a second transceiver radio, a radio-to-local-area-network converter, and a power line Ethernet adapter in each of said plurality of first communication subsystems;

providing a plurality of second communication subsystems at the opposite side of the physical barrier;

interconnecting a first handheld transceiver radio, a second transceiver radio, a radio-to-local-area-network converter, and a power line Ethernet adapter in each of said second communication subsystems; and extending at least one linking electrical conductor from said electrical AC power distributing infrastructure on said one side to said power line Ethernet adapter of said second communication subsystem on said opposite side of the physical barrier.

14. The method of claim 13 further comprising the steps of:

coupling said plurality of second communication subsystems on the opposite side of the physical barrier to a second electrical AC power distributing infrastructure having electrical conductors and AC outlets.

15. A method of claim 14 further comprising the steps of:

linking said first electrical AC power distributing infrastructure and said second electrical AC power distributing infrastructure by at least one linking electrical conductor.

16. The method of claim 15 further comprising the step of:

coupling a plurality of first handheld transceiver radios in electromagnetic communication with at least some of said second handheld transceiver radios of said first and second communication subsystems.

17. A system for electromagnetically communicating past an electromagnetic barrier created by a physical barrier comprising:

first means for distributing electrical AC power in an infrastructure on one side of the physical barrier, said first electrical AC power distributing means having electrical conductors and AC outlets;

first means for communicating electromagnetic information at the one side of the physical barrier and being connected to said electrical conductors of said first electrical AC power distributing means, said first electromagnetic information communicating means having a first handheld transceiver radio, a second transceiver radio, a radio-to-local-area-network converter, and a power line Ethernet adapter;

a second means for communicating electromagnetic information at an opposite side from the first side of the physical barrier, said second electromagnetic information communicating means having a first handheld transceiver radio, a second transceiver radio, a radio-to-local-area-network converter, and a power line Ethernet adapter; and at least one electrical conductor extending from said first electrical AC power distributing means to said power line Ethernet adapter of said second electromagnetic information communicating means.

18. A system for electromagnetically communicating across a physical barrier having one side and an opposite side comprising:

first means for distributing electrical AC power in an infrastructure on the one side of the physical barrier, said first electrical AC power distributing means having electrical conductors and AC outlets;

a plurality of first means for communicating electromagnetic information at the one side of the physical barrier and being connected to said electrical conductors of said first electrical AC power distributing means, said plurality of first electromagnetic information communicating means each having a first handheld transceiver radio, a second transceiver radio, a radio-to-local-area-network converter, and a power line Ethernet adapter;

a plurality of second means for communicating electromagnetic information at the opposite side of the physical barrier, said plurality of second electromagnetic information communicating means each having a first handheld transceiver radio, a second transceiver radio, a radio-to-local-area-network converter, and a power line Ethernet adapter; and at least one electrical conductor extending from said plurality of second electromagnetic information communicating means to said first electrical AC power distributing means.

19. The system of claim 18 further comprising:

second means for distributing electrical AC power in an infrastructure on the opposite side of the physical barrier, said second electrical AC power distributing means having electrical conductors and AC outlets for coupling to said plurality of second electromagnetic information communicating means.

* * * * *